United States Patent [19]

Wilson, Jr.

[11] 3,954,097
[45] May 4, 1976

[54] SOLAR HEAT COLLECTOR

[75] Inventor: Leon T. Wilson, Jr., Glastonbury, Conn.

[73] Assignee: Wilson Solar Kinetics, Hartford, Conn.

[22] Filed: Sept. 16, 1974

[21] Appl. No.: 506,551

[52] U.S. Cl. .............................. 126/271; 237/1 A; 165/142
[51] Int. Cl.² .......................................... F24J 3/02
[58] Field of Search ............ 126/271, 270; 165/142; 237/1 A

[56] References Cited
UNITED STATES PATENTS

| | | | |
|---|---|---|---|
| 980,505 | 1/1911 | Emmet | 126/271 |
| 1,880,938 | 10/1932 | Emmet | 126/271 |
| 2,872,915 | 2/1959 | Bowen | 126/271 |
| 3,227,153 | 1/1966 | Godel et al. | 126/271 |
| 3,841,738 | 10/1974 | Caplan | 126/271 X |

FOREIGN PATENTS OR APPLICATIONS

| | | | |
|---|---|---|---|
| 748,417 | 6/1944 | Germany | 165/142 |

Primary Examiner—Kenneth W. Sprague
Assistant Examiner—James C. Yeung
Attorney, Agent, or Firm—McCormick, Paulding & Huber

[57] ABSTRACT

An elongated solar heat collector is formed by means of a heat exchanger having two thin-walled tubes arranged coaxially of one another, a cylindrical, transparent heat shield positioned coaxially around the tubes and an elongated parabolic reflector mounted to locate the focal axis of the reflector on the axis of the tubes and shield. The outer tube of the heat exchanger has helical corrugations extending along a greater portion of its length and the valleys of the corrugations are made to contact the outer surface of the inner tube so that a helical passageway is defined between the inner and outer tubes. The straight elongated passageway of the inner tube and the helical passageway between the coaxial tubes communicate with one another at one end of the elongated collector so that two fluid flow paths defined by the passageways are serially connected and permit a fluid heat exchange medium such as water to flow in and out of the exchanger. With such construction, solar energy directed from the reflector through the transparent shield heats the water or other medium by conduction when the medium flows in one direction through the inner tube as well as when the water flows in the opposite direction in the helical passageway within the outer tube.

6 Claims, 2 Drawing Figures

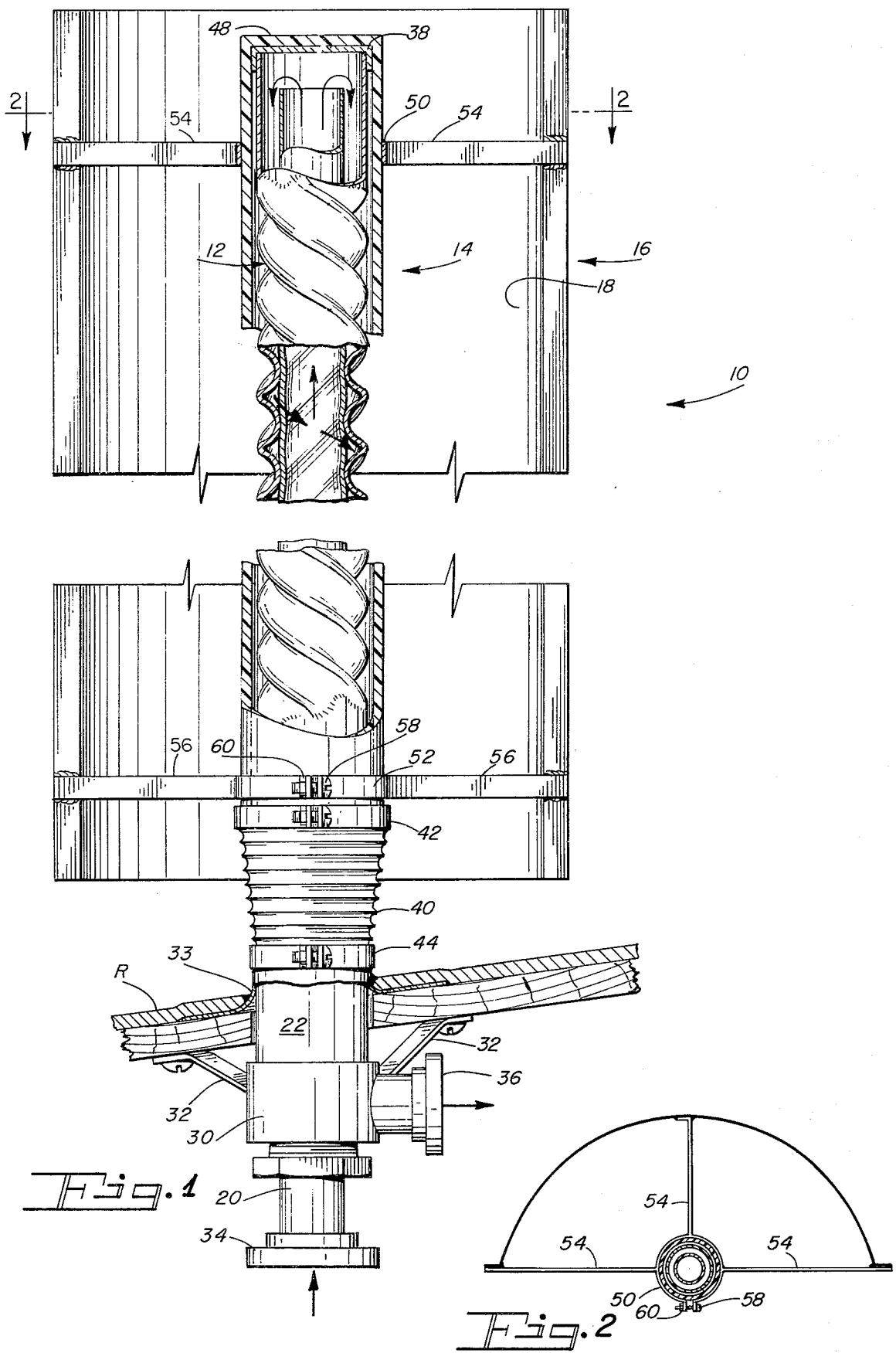

SOLAR HEAT COLLECTOR

BACKGROUND OF THE INVENTION

The present invention relates to a solar heat collector for heating buildings and other structures. More particularly, the present invention relates to an elongated solar heat collector through which a fluid medium is circulated and heated along two coaxially arranged flow paths.

U.S. Pat. No. 2,557,478 discloses a heating system that operates on solar energy. Solar heat collectors transfer solar energy to a liquid heat exchange medium such as water which is held in a large storage tank or reservoir in the structure to be heated. When the structure requires heat, a heat pump circulates a second heat exchange medium through an exchanger within the reservoir or circulates the heated medium itself through still other heat exchangers in a room or rooms of the structure calling for the heat. If a reversible heat pump is employed, it is possible to transfer heat away from the various rooms of the structure through the reservoir and heat collector. Thus, for example, in winter solar heat may be collected during daylight hours for heating a structure throughout the entire day. In summer, heat may be removed from the structure during the daylight hours for cooling and released through the solar collector at night.

Obviously, the efficiency of the solar heat collector is of principal concern in a heating system such as that shown and described in the identified patent. Regardless of the type of heat exchange medium employed, it is desirable that the medium be exposed to collected solar energy over the greatest possible portion of its flow path through the collector. In many prior art collectors, a fluid is circulated along coaxial fluid flow paths, however, direct conductive heating of the fluid through a tube wall occurs only along the outer path due the collector construction and the coaxial arrangement of the paths. U.S. Pat. No. 2,205,378 illustrates a solar energy collector of this type.

Elongated collectors with serially connected and coaxially arranged flow paths are desirable due to their compact construction. They can be mounted vertically either from the roof of a structure or a sidewall, and in such position they are selfcleaning in that dirt and other particles which reduce heat transfer coefficients either fall away from reflecting or heating surfaces or are washed away by weather elements. Improved efficiency of such collectors could be achieved by a design which allows the heat exchange medium circulated through the collector to be directly heated by solar energy along each of the coaxial flow paths.

Accordingly, it is a general object of the present invention to disclose a solar heat collector which permits a heat exchange medium circulated along coaxially arranged, serially connected flow paths to be heated by solar energy in substantially the same manner along both flow paths.

SUMMARY OF THE INVENTION

The present invention resides in a solar heat collector for heating water or other fluid exchange mediums. The collector has an elongated heat exchanger providing two fluid flow paths each extending substantially the full length of the exchanger and being serially interconnected at one end so that the medium flows back and forth through the exchanger. The flow paths are coaxial in that one of the flow paths is defined by a single elongated passageway within an inner tube and the other flow path has at least one helical passageway circulating around the elongated passageway defined by an outer tube having a helically corrugated tube wall. The helical passageway permits fluid in the elongated passageway to receive solar energy between the convolutions or coils of the outer tube by direct conduction through the tube walls.

An annular heat shield made from an optically transparent material such as plastic surrounds the heat exchanger along a major portion of its length to trap heat adjacent the exchanger. An elongated reflector having a generally parabolic reflecting surface focuses incident solar energy onto a focal line of the reflector. The reflector is mounted by suitable means so that the focal line and the elongated heat exchanger are generally colinear.

BRIEF DESCRIPTION OF THE DRAWINGS

FIG. 1 is an elevation view of the solar heat collector partially in section.

FIG. 2 is a top plan view of the collector in FIG. 1.

DESCRIPTION OF THE PREFERRED EMBODIMENTS

FIG. 1 illustrates the elongated solar heat collector of the present invention projecting vertically from a roof R for exposure to solar radiation. The roof is part of the structure heated by a system to which the collector 10 is attached, such heating system being of the type illustrated in U.S. Pat. No. 2,575,478 identified above. While the collector is shown mounted vertically from a roof, it may also be mounted vertically from the side of the structure if such mounting should happen to provide the greatest exposure to solar radiation and protection from other elements such as wind and dust which reduce the heat transfer characteristics of the collector.

The collector is comprised principally of an elongated heat exchanger 12, an optically transparent heat shield 14 mounted coaxially over the exchanger 12 and an elongated reflector 16 having a parabolic reflecting surface 18 which focuses incident solar energy onto a focal line located colinearly of the axis of the heat exchanger and shield. The reflecting surface 18 directs solar energy through the transparent heat shield 14 to the heat exchanger 12 and a fluid heat exchange medium such as water is circulated through the exchanger from the heating system within the structure to assimilate the collected energy.

The heat exchanger 12 is comprised of a thin-walled inner tube 20 and a thin-walled outer tube 22 mounted coaxially of the inner tube. Both tubes 20 and 22 are made from copper or aluminum for high thermal conductivity. The outer tube has a series of helical corrugations along a substantial portion of the tube wall exposed above the roof R. The corrugations define a series of helically extending ridges and valleys on the inner and outer surfaces of the tube 22, and the valleys on the inner surface contact helical sealing areas on the outer surface of the inner tube 20 to define at least one helically extending passageway about the tube 20 for the heat exchanging medium. More than one helical passageway is defined if the corrugations are formed by more than one continuous helix.

The valleys of the corrugations on the inner surface of the tube 22 may be mechanically pressed into contact with the outer surface of the inner tube 20 to establish the helical sealing areas between adjacent convolutions of the corrugations, or other suitable sealing means may be provided. The mechanical contact seal between the two tubes can be generated while the corrugations are produced on the outer tube by twisting and axially compressing the outer tube 22 over inner tube as explained in greater detail in U.S. Pat. No. 3,730,229. The shallow corrugations produced on the inner tube 20 generate a slight swirling motion of the heat exchange medium for improved heat transfer as the heat exchange medium is pumped axially along the elongated passageway defined by the inner tube.

At the bottom end of the heat collector 10 below the roof R, the heat exchanger 12 is supported by a bracket 30 and three struts 32 connected with the inner side of the roof R. Suitable flashing 33 would also be used between the heat exchanger and the shingles in order to provide a weather seal. The lower end of the heat exchanger is also provided with couplings 34 and 36 for connection with other plumbing of the associated heating system. The coupling 34 is connected to the inner tube 20 and preferably serves as the inlet for a heat exchange medium. Correspondingly, the coupling 36 is connected to the outer tube 22 and serves as the outlet.

At the upper end of the heat exchanger 12 the outer tube 22 extends beyond the adjacent, open end of the inner tube 20 and is closed by means of a cap 38. Effectively, the cap 38 serves as an end wall which interconnects the elongated passageway through the inner tube 20 and the helical passageways defined between the corrugations of the outer tube 22 and the outside surface of the inner tube 20. From this construction it will be understood that there are two coaxially arranged flow paths defined by the elongated passageway and the helical passageways. A fluid heat exchange medium enters the inner tube 20 below the roof R at the coupling 34 and passes upwardly through the elongated passageway of the tube 20 while receiving heat energy by direct conduction through the tube walls at the helical sealing areas of the tubes 20 and 22. The fluid then returns to the coupling 36 through the helical passageways and receives heat energy by conduction through the corrugations of the outer tube walls. An annular spacer is soldered in place between the lower ends of the inner and outer tubes 20 and 22 to insure that the fluid medium is diverted out through the coupling 36.

The heat shield 14 is provided to prevent trapped solar energy within the annular region between the outer tube 22 of the heat exchanger 12 and the inner surface of the shield from escaping by convection. The shield is cylindrical in shape and fits loosely over the corrugations of the outer tube 22. The upper end of the shield is closed by an end wall 48 so that the shield may simply rest on the cap 38 of the heat exchanger. The lower end of the shield is fastened to the outer tube 22 by means of a tubular boot 40 and a pair of removable clamps 42 and 44. The upper end of the boot surrounds the lower end of the cylindrical shield and is held tightly against the shield by the clamp 42 while the lower end surrounds a smooth cylindrical portion of the tube 22 below the corrugations and above the roof R, and is held tight against the tube by the clamp 44. The boot 40 thus seals the annular space between the shield 14 and the heat exchanger 12.

An optically transparent material such as a clear acrylic plastic is utilized to fabricate the heat shield. Solar radiation may then pass through the shield to the heat exchanger but cannot readily leave the exchanger. Wind, rain and other environmental influences are prevented from carrying heat away from the surface of the heat exchanger 12 and operational efficiency is thus improved.

The elongated reflector 16 is mounted on the heat shield 14 by means of two mounting brackets 50 and 52 having annular portions circumscribing the shield and a plurality of generally radially extending arms 54 and 56. The bracket 50 and the radially extending arms 54 shown in FIG. 2 extend between the shield and reflector adjacent the upper end of the elongated heat exchanger 12 while the bracket 52 and arms 56 extend in similar fashion between the shield and reflector adjacent the lower end of the exchanger. Each bracket is constructed as a clamp and has a clamping screw 58 and nut 60 shown most clearly in FIG. 2 for securing or releasing the brackets on the shield and permitting the reflector 16 to be turned angularly about the heat exchanger 12 to any desired position.

The reflecting surface 18 of the reflector 16 is an elongated and generally parabolic surface as shown most clearly in FIG. 2. The radially extending arms 54 and 56 have lengths selected to locate the focal axis of the reflecting surface colinearly with the central axis of the heat exchanger 12. Thus the reflector can be rotated about the heat exchanger to a position which optimizes the amount of solar energy focused on the corrugated surface of the heat exchanger during any given portion of the daylight hours. To further improve the absorption characteristics of the heat exchanger, it is contemplated that the outer surface of the tube 22 may be painted black to reduce its emissivity and thereby allow the exchanger to more nearly exhibit black body characteristics in the infrared spectrum.

While the collector 10 has been described in a form suitable for absorbing solar radiation, it may be partially disassembled for use as a radiator of heat to cool a medium circulated through the heat exchanger 12. By loosening the clamp 44, the reflector 16, the shield 14 and the boot 40 can be slipped upwardly over the corrugations of the heat exchanger 12 and be entirely removed. If a heat exchange medium is then circulated through the tubes 20 and 22 when the ambient temperature surrounding the heat exchanger is less than that of the medium, heat will be transferred away from the medium. Thus the heat exchanger can be used to cool the medium at night when the outside temperature drops below, for example, 65°F, and if sufficient quantities of the cooled medium are held in storage, the structure below the roof R may be cooled during the following day when elevated temperatures exist outside of the structure.

Thus an elongated solar heat collector has been disclosed which is self-cleaning when mounted in a vertical position. A heat exchange medium is circulated through the collector along two coaxial flow paths and solar energy is transferred to the medium by direct conduction through heat exchanger walls along both flow paths. The reflector 16 may be adjusted about the heat exchanger 12 to reflect solar energy from any direction onto the exchanger, and the reflector 12 and shield 14 can be easily removed to permit the heat exchanger to serve as a radiator.

While the present invention has been described in a preferred embodiment, it should be understood that numerous modifications and substitutions can be had without departing from the spirit of the invention. For example, although the tubular boot 40 has been used to seal the lower end of the heat shield 14 against the smooth portion of the outer tube 22, it should be recognized that still other types of removable sealing devices can be employed. The mechanical seal between the inner tube 20 and the outer tube 22 of the heat exchanger provided by pressing the thin tube walls together is preferred since it creates shallow convolutions in the inner tube 20 which stimulate turbulent flow and more efficient heat transfer. However, other bonding processes between the two tubes 20 and 22 can be used. Although, a liquid heat exchange medium is most frequently used in solar energy heating systems, it is also contemplated that a gaseous medium be used in the disclosed apparatus. Accordingly, the present invention has been described in a preferred embodiment by way of illustration rather than limitation.

I claim:

1. A solar heat collector for heating water or other fluid heat exchange mediums, said collector comprising:

an elongated heat exchanger providing two fluid flow paths each extending substantially the full length of said exchanger, said exchanger including means serially connecting said two flow paths at one end of said exchanger so that fluid introduced at one end of said exchanger to one of said flow paths first traverses the length of said exchanger by flowing along one of said flow paths in one direction and then traverses the length of said exchanger by flowing through the other of said flow paths in the opposite direction, said flow paths being defined by two coaxially positioned, thin walled tubes, having internal passageways, one of the tubes being helically corrugated along a substantial portion of its length whereby one of said flow paths includes an elongated passageway coaxially within the two tubes and the other of said flow paths includes at least one helical passageway circulating around said elongated passageway;

a heat trapping annular shield of optically transparent material surrounding said heat exchanger and extending along a major portion of its length;

an elongated reflector having an elongated and generally parabolic reflecting surface which focuses incident solar energy onto a focal line extending along the length of said reflector; and means mounting said reflector relative to said heat exchanger with said heat exchanger generally colinear with said focal line.

2. A solar heat collector as defined in claim 1 further characterized by said tubes of the elongated heat exchanger being an outer tube and an inner tube located within said outer tube, the interior of said inner tube defining said elongated passageway, said outer tube being helically corrugated to define on its interior surface a series of helically extending ridges and valleys, said helically extending valleys on the interior surface of said outer tube contacting the outer surface of said inner tube to define said at least one helically extending passageway constituting said other flow path.

3. A solar heat collector as defined in claim 2 further characterized by said mounting means for said reflector comprising at least two mounting brackets, each of said mounting brackets having an annular portion circumscribing said cylindrical shield and a plurality of generally radially extending arms each connected to said reflector, and releasable means for fixing said annular portions to said cylindrical shield whereby said annular bracket portions may be released from said shield to permit said reflector to be turned angularly to any desired position with respect to said shield and to then be fixed in such selected position.

4. A solar heat collector as defined in claim 2 further characterized by said outer tube at said one end of said exchanger extending beyond the end of said inner tube, said means for serially connecting said flow paths comprising an end wall closing said outer tube at said one end of said exchanger, said cylindrical shield at the ends thereof adjacent said one end of said exchanger also having an end wall closing such end of said shield, said end wall of said shield resting on said end wall of said exchanger when said collector is mounted with said exchanger oriented generally vertically with said one end thereof uppermost.

5. A solar heat collector as defined in claim 4 further characterized by said heat exchanger at said other end thereof extending beyond the adjacent end of said shield, and a tubular boot of flexible material at said end of said exchanger, said tubular boot having one end thereof surrounding and connected to said shield and having its other end surrounding and connected to said heat exchanger so as to seal the annular space between said shield and said heat exchanger.

6. In a solar energy heating system for use with a structure having a roof, the combination comprising an elongated heat exchanger having a first end and a second end and having two flow paths extending along the length thereof, said two flow paths being serially connected to one another at said second end of said exchanger so that the fluid heat exchange medium introduced to one of said flow paths at said first end of said exchanger first flows along the length of said exchanger from said first end to said second end through said one flow path and then flows along the length of said exchanger from said second end to said first end through the other of said flow paths, said exchanger at said first end including means for introducing a fluid heat exchange medium to one of said flow paths and for extracting said fluid heat exchange medium from the other of said flow paths, said heat exchanger having a smooth mounting portion adjacent said first end with a generally cylindrical outer surface and said exchanger having a solar energy heat absorbing portion located between said smooth portion and said second end thereof, means for mounting said heat exchanger generally vertically of a roof such as aforesaid with said mounting portion thereof passing through said roof so that said heat absorbing portion extends generally vertically upwardly beyond said roof in a free standing manner, a cylindrical heat trapping shield of optically transparent material surrounding said heat exchanger, said shield having an end wall at its upper end resting on said second end of said heat exchanger, said shield terminating at its lower end at a location spaced upwardly from said roof when the exchanger is mounted by said mounting means, a tubular boot of flexible material between said lower end of said cylindrical shield and said smooth portion of said heat exchanger for sealing the space between said shield and said exchanger, an elongated reflector with a generally parabolic reflecting surface extending along the major portion of the length of said absorbing portion of said exchanger and arranged so that said reflecting surface tends to focus solar energy onto said heat exchanger, and at least two mounting brackets spaced from one another along the length of said exchanger and connected to said shield and to said reflector for supporting said reflector from said shield.

* * * * *

UNITED STATES PATENT OFFICE
CERTIFICATE OF CORRECTION

Patent No. 3,954,097  Dated May 4, 1976

Inventor(s) Leon T. Wilson, Jr.

It is certified that error appears in the above-identified patent and that said Letters Patent are hereby corrected as shown below:

Column 5, line 67, "cylindrical" should be --annular--.

Column 6, line 2, "cylindrical" should be --annular--.

Column 6, line 12, "cylindrical" should be --annular--.

Signed and Sealed this

Third Day of August 1976

[SEAL]

Attest:

RUTH C. MASON  
Attesting Officer

C. MARSHALL DANN  
Commissioner of Patents and Trademarks